Dec. 9, 1958
I. PELLIZZETTI
2,863,518
MOTOR VEHICLE EQUIPPED WITH WHEELS CAPABLE
OF STEERING SUBSTANTIALLY THROUGH 90° FROM
THEIR STRAIGHT DRIVE POSITION
Filed June 25, 1957

United States Patent Office 2,863,518
Patented Dec. 9, 1958

2,863,518

MOTOR VEHICLE EQUIPPED WITH WHEELS CAPABLE OF STEERING SUBSTANTIALLY THROUGH 90° FROM THEIR STRAIGHT DRIVE POSITION

Italo Pellizzetti, Turin, Italy

Application June 25, 1957, Serial No. 667,836

1 Claim. (Cl. 180—79.2)

This invention relates to a motor vehicle having the characteristic feature that it is equipped with wheels capable of being steered substantially through 90° from their straight drive position, as well as with means for steering the wheels on each axle independently of the wheels on the other axle.

Figure 1:
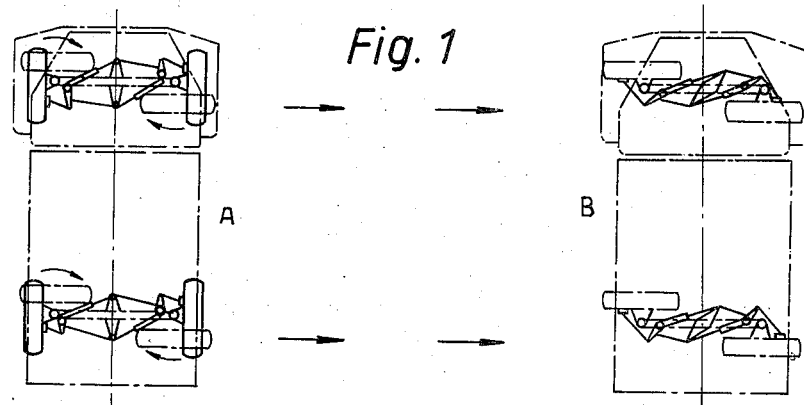
Figure 2:
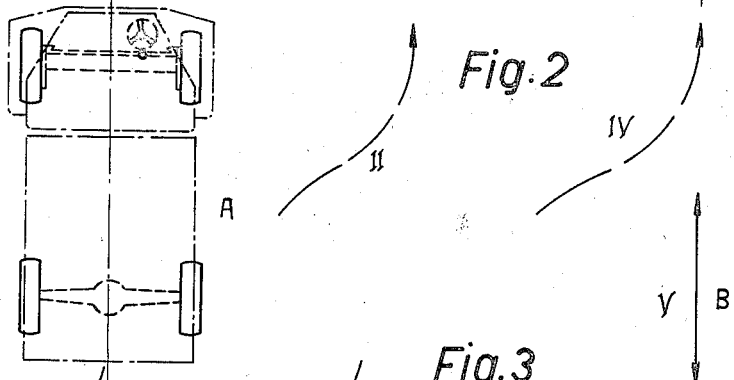
Figure 3:
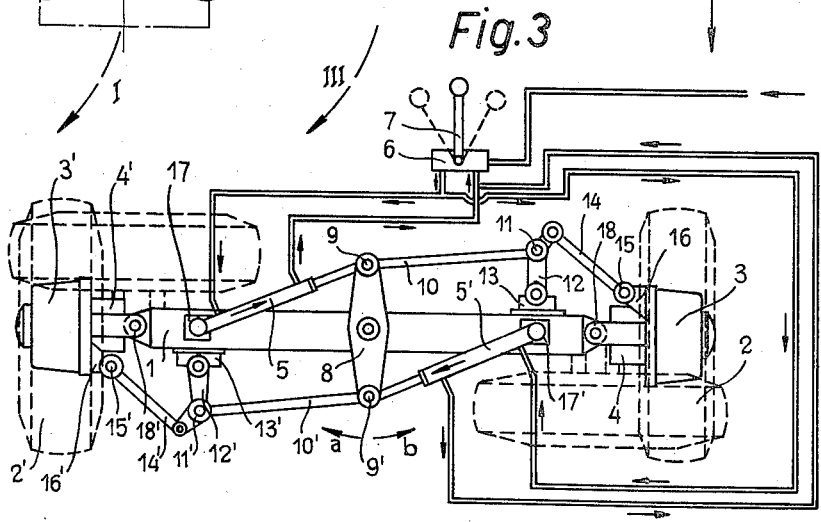

The invention will be described with reference to the accompanying drawings, given by way of example only, wherein:

Figure 1 is a plan view from below of an improved motor vehicle, on which the necessary operations for lateral displacement of the vehicle are diagrammatically indicated, Figure 2 is a plan view from below of a conventional motor vehicle, on which the necessary operations for lateral displacement of the vehicle are diagrammatically indicated, Figure 3 is a plan view from below of a motor vehicle axle equipped with the improved device for simultaneously steering the wheels on the axle.

The increasing demand for hydraulic mechanism in industry, more particularly in the field of lifting and transport mechanisms, excavating machines, mechanical shovels etc. creates the need for a device affording in addition to normal steering, an orthogonal displacement of said mechanisms with respect to the longitudinal vehicle axis, or "lateral crab-like displacement."

In fact, the above mechanisms are often required to perform small lateral displacements and accurately reach a certain station in order to perform a given work, within a restricted space. The present-day conventional steering angle would necessitate three, four or even more operations including reverse, steering and forward drive, implying an enormous loss of time and wear of the vehicle for effecting the small displacement laterally of its primitive position, provided always the available space will permit.

The improved device satisfactorily solves the problem by providing a vehicle capable of lateral displacement by one operation, whatever the amount of displacement and the available space may be, even where the latter merely equals or just slightly exceeds the vehicle's length.

In the improved device the four vehicle wheels are fully inrependent of one another, each of them acting as a driving wheel through a hydraulic motor incorporated by the wheel hub.

Consequently, the rear wheels being no longer bound to a differential gear can be orientated and moved at will, even independently of each other, while the front wheels, which are now likewise driving wheels, further serve their normal steering purpose when they are not used for lateral displacement.

Now, by steering through a small angle, which is equal for all the wheels, the four wheels by means of the improved arrangement, the drive will be in an oblique direction where the angle is smaller than 90° or the drive will be fully orthogonal to normal drive of the vehicle if the angle is accurately 90°. This arrangement is the main characteristic feature of the invention and is shown in the enclosed drawing, on the left of which a motor vehicle with its wheels in a normal position, and orthogonal position respectively, that is, after steering through 90° by one operation only, is diagrammatically shown on the left and right, respectively. Operation of one hydraulic control lever simultaneously steers the four vehicle wheels through 90°, whereupon the four wheel motors are started, the desired displacement is effected, on completion of which the vehicle is stopped accurately in the desired position.

In actual use the front wheels are preferably controlled separately of the rear wheels because, while the rear wheels should be steered through 90° only where a manoeuvre as above explained is required, the front wheels should additionally serve also for normal drive on the road or for normal displacements, when the rear wheels should be constantly maintained in their normal position.

Figure 3 of the accompanying drawing shows by way of example a construction of the improved device, but it will be understood that any modification required by actual circumstances is possible within the scope of this invention.

In Figure 3 which shows the fully assembled device on one axle only from below for the sake of clearness and in normal drive condition, 1 denotes the vehicle axle, 2, 2' the wheels, the hubs 3, 3' of which incorporate hydraulic motors 4, 4'. Hydraulic rams 5, 5' are provided which are mounted oppositely and simultaneously controlled by a delivery valve 6 through a hand lever 7 by means of the fluid flowing as shown by arrows in the diagram from the general hydraulic plant G on the vehicle. The piston rods of the rams abut at beam 8 fulcrumed to the middle of the axle 1 for movement in either direction $a$ or $b$, as denoted by the arrows, depending upon the control received. The beam 8 has secured to its ends by means of spherical joints 9, 9' two adjustable rods or links 10, 10' secured in turn by further spherical joints 11, 11' to two crank levers 12, 12' fulcrumed at one end to supports 13, 13' fixed to the axle. The crank levers 12, 12' are provided at other end with two spherical joints having secured thereto two further adjustable rods 14, 14' which are connected at their other ends through two further spherical joints 15, 15' to bearings 16, 16' fixedly secured to the hubs 3, 3' on the wheels 2, 2'.

The cylinders of the hydraulic rams 5, 5' are fulcrumed to supports 17, 17' rigidly secured to the axle 1 for rotation in a horizontal plane through a certain angle when energized for operating the above described linkage.

Assuming the delivery valve 6 is capable of taking three fixed positions, namely "right," "straight" and "left," since the rams are simultaneously operated in opposition for their piston rods to simultaneously act on both ends of the beam 8 to rotate it through a certain angle inasmuch as it is fulcrumed on a middle pivot, the operation of the improved device can be explained with reference to Figure 3 by the following example.

As the lever 7 is moved from its "straight" position, in which it is shown on the drawing, to the "right" position, the fluid G from the hydraulic plant on the vehicle pushes forward the piston 5, and the beam 8 is moved in the direction shown by the arrow $a$.

Upon movement of the beam 8, one end thereof pushes the rod 10 to rotate through a certain angle the crank 12 which is connected over the rod 14 to the bearing or steering arm 16 and transmits to the latter the rotational angle received with a suitable amplification in order to obtain the desired angle. The bearing 16 in turn transmits this movement to the hub 3 on the wheel 2 which, being fulcrumed on the king pin 18 on the axle 1 is rotated through the desired angle.

The other end of the beam 8 performs the same movements in a reverse direction, whereby the rod 10', crank 12', rod 14' and so on up to the wheel 3' are displaced and both wheels are simultaneously steered through the same angle and at the same time.

In the above example a 90° angle has been shown, so that at the end of the stroke of the rams 5, 5' the wheels are visible in the dotted position, which is at 90° to the longitudinal axis of the vehicle, hence parallel with the axle.

In order to restore the wheels to their original position, it will be sufficient to move the lever 7 to its "left" position by the necessary extent, thereupon to its "straight" position. It will be obvious that in the course of this process all the above described movements take place in a reverse direction starting with the beam 8 which will rotate in the direction of the arrow b. A description thereof is therefore superfluous.

Normal steering is still operated by means of the lever 7 which should be handled with a certain skill.

The important advantages afforded by the improved device in operation will be easily understood from the following example.

Assuming a complete motor vehicle stands in a position as diagrammatically indicated on Figure 1 and is to be laterally moved to the position B which is spaced from the former for instance about 10 meters, it will be sufficient to simultaneously or successively impress to the two devices mounted on the two axles the above described movement, whereby the wheels reach the position indicated by dotted lines by following the arc of a circle indicated by the four curved arrows. At this stage wheel motors 4, 4' (Figure 3) on each axle are energized and simultaneously driven, whereby the vehicle moves to the position B by following the rectilinear paths shown. On reaching the desired position the motors are stopped.

The vehicle is restored to its position A by operating the motors in a direction opposite the previous one.

The advantage afforded by the improved device will be further appreciated from Figure 2 which diagrammatically shows, by way of comparison, a motor vehicle equipped with the conventional steering gear known heretofore. It will be seen that, for the purpose of demonstration, a larger space was required behind the vehicle to enable the reverse, steering and forward manoeuvres to be effected, which are denoted by dotted lines and arrows from position A in which the vehicle stands to position B. It is obvious that five operations I, II, III, IV, V are required for reaching the position B against one operation only required for the same purpose from the vehicle equipped with the improved device. The result is speed of work, reliability and ease of operation which are inherent of the improved device and enable mechanisms equipped therewith to yield performances never attained heretofore.

It is moreover possible to obtain through suitable delivery valves and control devices in addition to lateral displacement as shown, oblique drive in an intuitive manner which need not be described, upon angular displacement of the four wheels about their king pins through angles equal for all the wheels, smaller than 90° as described above.

The above constructions have been described by way of example, but may be varied in construction and size to suit actual requirements, without departing from the scope of this invention.

What I claim is:

In a motor vehicle, a pair of rigid axles, a pair of wheels on opposite ends of each axle steerable each through substantially 90° from its straight drive position, and means on each axle for steering the wheels through said defined angle, comprising a beam pivoted about a vertical axis extending substantially through the middle of the axle, a pair of levers fulcrumed at one end about vertical axes adjacent the ends of the axle and projecting forward and backward, respectively, of the axle, a steering arm associated with each of the wheels, a first pair of tie rods each hinged at one end to an intermediate point on a respective lever and at the opposite end to a respective end of the beam, a further pair of tie rods each hinged at one end to the free end of a respective lever and at its other end to the adjacent steering arm, and at least one fluid pressure operated jack anchored at one end to the axle and at its opposite end to one end of the beam thereby to rock the beam for steering the wheels.

References Cited in the file of this patent

UNITED STATES PATENTS

| | | |
|---|---|---|
| 638,331 | Grant | Dec. 5, 1899 |
| 2,334,918 | French | Nov. 23, 1943 |
| 2,430,528 | Moon | Nov. 11, 1947 |
| 2,526,282 | Sanmori | Oct. 17, 1950 |
| 2,549,925 | Paton | Apr. 24, 1951 |
| 2,624,415 | Moore | Jan. 6, 1953 |
| 2,800,336 | Major et al. | July 23, 1957 |

FOREIGN PATENTS

| | | |
|---|---|---|
| 553,075 | France | Feb. 3, 1923 |

UNITED STATES PATENT OFFICE
CERTIFICATE OF CORRECTION

Patent No. 2,863,518 December 9, 1958

Italo Pellizzetti

It is hereby certified that error appears in the above numbered patent requiring correction and that the said Letters Patent should read as corrected below.

In the heading to the printed specification, between lines 10 and 11, insert -- Claims priority, application Italy July 20, 1956 --.

Signed and sealed this 12th day of May 1959.

(SEAL)
Attest:

KARL H. AXLINE
Attesting Officer

ROBERT C. WATSON
Commissioner of Patents